United States Patent
Ahn et al.

(10) Patent No.: US 9,100,156 B2
(45) Date of Patent: Aug. 4, 2015

(54) FLEXIBLE ALLOCATION OF CONTROL SIGNAL RESOURCES

(75) Inventors: Joon Kui Ahn, Anyang-si (KR); Suck Chel Yang, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 966 days.

(21) Appl. No.: 13/264,148

(22) PCT Filed: Jun. 30, 2010

(86) PCT No.: PCT/KR2010/004237
§ 371 (c)(1),
(2), (4) Date: Oct. 12, 2011

(87) PCT Pub. No.: WO2011/002218
PCT Pub. Date: Jan. 6, 2011

(65) Prior Publication Data
US 2012/0033650 A1 Feb. 9, 2012

(30) Foreign Application Priority Data

Jun. 11, 2010 (KR) .................. 10-2010-0055376

(51) Int. Cl.
H04W 72/04 (2009.01)
H04L 5/00 (2006.01)
H04L 1/00 (2006.01)
H04L 1/16 (2006.01)
H04L 1/18 (2006.01)

(52) U.S. Cl.
CPC ............ *H04L 5/0053* (2013.01); *H04L 5/0091* (2013.01); *H04L 1/0026* (2013.01); *H04L 1/0027* (2013.01); *H04L 1/1671* (2013.01); *H04L 1/1854* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 2009/0252077 A1* | 10/2009 | Khandekar et al. | 370/312 |
| 2011/0007673 A1* | 1/2011 | Ahn et al. | 370/280 |
| 2011/0044259 A1* | 2/2011 | Nimbalker et al. | 370/329 |
| 2011/0064164 A1 | 3/2011 | Seo et al. | |
| 2011/0177807 A1* | 7/2011 | Cho et al. | 455/422.1 |

(Continued)

FOREIGN PATENT DOCUMENTS

KR 10-2010-0020422 A 2/2010

OTHER PUBLICATIONS

Kyocera, "Interference Management for Control Channels in Outdoor Hotzone Scenario," 3GPP TSG RAN WG1 Meeting #61, R1-102678, Montreal, Canada, May 10-14, 2010, pp. 1-2.

NEC, "Mapping of DL physical channels to physical resources for TS 36.508," 3GPP TSG-RAN WG5 #40, R5-083800, Jeju Island, Korea, Jun. 18-22, 2008, NEC, R5-083800, pp. 1-3.

(Continued)

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

A wireless communication system is disclosed. The method for processing a downlink subframe at a user equipment in a wireless communication system includes receiving information associated with a PHICH duration, receiving a subframe that includes a PHICH, a PDCCH, and a PDSCH, and obtaining the PDSCH after a lapse of the PDCCH duration. If the PHICH duration is larger than the PDCCH duration, the obtaining of the PDSCH is performed in consideration of PHICH resources in a duration that corresponds to the PHICH duration but not to the PDCCH duration.

4 Claims, 10 Drawing Sheets

(56) References Cited

U.S. PATENT DOCUMENTS

2012/0163287 A1* 6/2012 Raaf et al. .................. 370/315
2012/0170458 A1* 7/2012 Zee et al. .................... 370/232
2012/0300635 A1* 11/2012 Jersenius et al. ............ 370/235

OTHER PUBLICATIONS

Samsung, "PDCCH Extension to Support Operation with Cross-Carrier Scheduling," 3GPP TSG RAN WG1 #60, R1-101142, San Francisco, California, Feb. 22-26, 2010, pp. 1-2.

* cited by examiner

FLEXIBLE ALLOCATION OF CONTROL SIGNAL RESOURCES

This application is the National Phase of PCT/KR2010/004237 filed on Jun. 30, 2010, which claims priority under 35 U.S.C. 119(e) to U.S. Provisional Application No. 61/221,572 filed on Jun. 30, 2009 and under 35 U.S.C. 119(a) to Patent Application No. 10-2010-0055376 filed in the Republic of Korea on Jun. 11, 2010, all of which are hereby expressly incorporated by reference into the present application.

TECHNICAL FIELD

The present invention relates to a wireless communication system, and more particularly, to a method for flexible allocation of control signal resources and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE OF INVENTION

Technical Problem

Accordingly, the present invention is directed to a flexible allocation method and apparatus for control signal resources that substantially obviates one or more problems due to limitations and disadvantages of the related art.

An object of the present invention is to provide a flexible allocation method for control signal resources and an apparatus for the same.

It is to be understood that objects to be achieved by the present invention are not limited to the aforementioned objects and other objects which are not mentioned will be apparent from the following description to those of ordinary skill in the art to which the present invention pertains.

Solution to Problem

The object of the present invention can be achieved by providing a method for processing a downlink subframe at a user equipment in a wireless communication system, the method including receiving information associated with a Physical Hybrid-automatic repeat request (ARQ) Indicator Channel (PHICH) duration, receiving a subframe that includes a Physical Hybrid-automatic repeat request (ARQ) Indicator Channel (PHICH), a Physical Downlink Control Channel (PDCCH), and a Physical Downlink Shared Channel (PDSCH), and obtaining the PDSCH from next of a PDCCH duration on the subframe. If the PHICH duration is larger than the PDCCH duration, the obtaining of the PDSCH is performed in consideration of PHICH resources in a duration that corresponds to the PHICH duration but not to the PDCCH duration.

In another aspect of the present invention, provided herein is a user equipment including a radio frequency (RF) unit for transmitting and receiving RF signals, and a processor connected to the RF unit. The RF unit receives information associated with a Physical Hybrid-automatic repeat request (ARQ) Indicator Channel (PHICH) duration, and receives a subframe that includes a Physical Hybrid-automatic repeat request (ARQ) Indicator Channel (PHICH), a Physical Downlink Control Channel (PDCCH), and a Physical Downlink Shared Channel (PDSCH). The processor obtains the PDSCH from next of a PDCCH duration on the subframe, and, if the PHICH duration is larger than the PDCCH duration, obtains the PDSCH in consideration of PHICH resources in a duration that corresponds to the PHICH duration but not to the PDCCH duration.

The obtaining of the PDSCH may include collecting remaining resources other than the PHICH resources in a duration that corresponds to the PHICH duration but not to the PDCCH duration.

The obtaining of the PDSCH may include replacing content of the PHICH resources with a specific value in a duration that corresponds to the PHICH duration but not to the PDCCH duration.

The specific value may include zero '0'.

In another aspect of the present invention, provided herein is a method for processing a downlink subframe at a user equipment in a wireless communication system including receiving information associated with a PHICH duration, receiving a subframe including a PHICH and a PDCCH, and, if the PDCCH duration is smaller than the PHICH duration, obtaining the PDSCH from resources located behind the PHICH duration.

In another aspect of the present invention, provided herein is a user equipment including a radio frequency (RF) unit for transmitting and receiving RF signals; and a processor connected to the RF unit. The RF unit receives information associated with a PHICH duration, and receives a subframe that includes a PHICH, a PDCCH, and a PDSCH. If the PDCCH duration is smaller than the PHICH duration, the processor obtains the PDSCH from resources located behind the PHICH duration.

The user equipment may obtain an additional control channel or a reference signal from a duration that corresponds to the PHICH duration but not to the PDCCH duration.

Advantageous Effects of Invention

The flexible allocation method and apparatus according to an embodiment of the present invention can flexibly allocate control signal resources in a wireless communication system.

It is to be understood that the advantages that can be obtained by the present invention are not limited to the aforementioned advantage and other advantages which are not mentioned will be apparent from the following description to those of ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
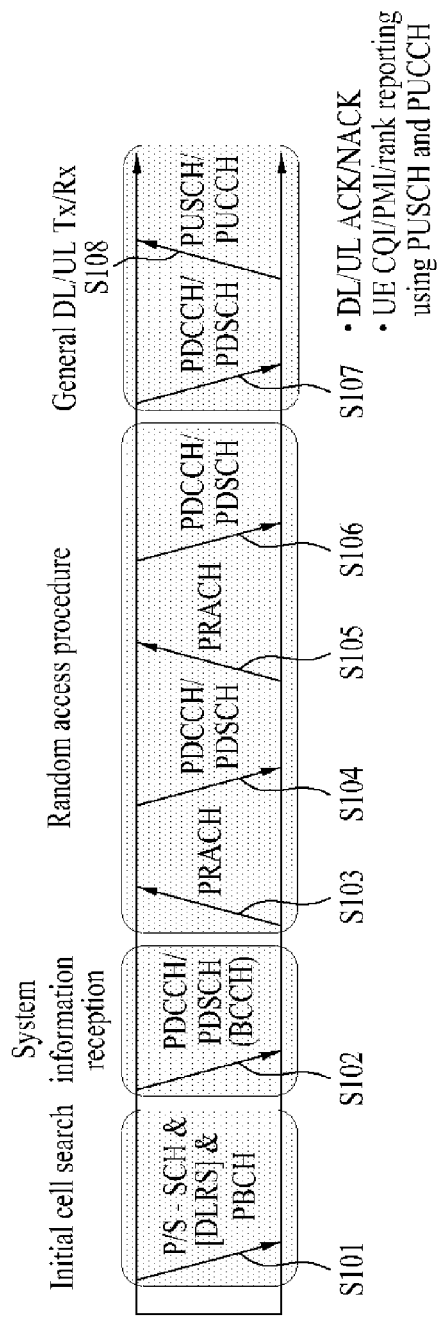
FIG. 1 illustrates physical channels of a 3rd Generation Partnership Project (3GPP) system and signal transmission using the physical channels.

FIG. 1 illustrates physical channels of a Long Term Evolution (LTE) system and signal transmission using the physical channels.

Referring to FIG. 1, if a user equipment (UE) is powered on or enters a new cell, it performs initial cell search such as synchronization with a base station (BS) at step S101. For the initial cell search, the UE receives a primary synchronization channel (P-SCH) and a secondary synchronization channel (S-SCH) from the BS, establishes synchronization with the BS, and obtains information such as a cell identity (cell ID). Thereafter, the UE receives a physical broadcast channel from the BS such that it can obtain broadcast information belonging to a cell.

After performing the initial cell search, the UE receives a physical downlink control channel (PDCCH) and a physical downlink shared channel (PDSCH) based on information loaded on the PDCCH, such that it can obtain more detailed system information at step S102.

Meanwhile, in the case where the UE initially accesses the BS or has no radio resources for signal transmission, the UE can perform a Random Access Channel (RACH) procedure for the BS at steps S103 to S106. For the RACH procedure, the BS transmits a specific sequence as a preamble through a Physical Random Access Channel (PRACH) at step S103 to S105, and receives a response message to the preamble through a PDCCH and a PDSCH corresponding to the PDCCH at steps S104 and S106. In contention-based RACH, a contention resolution procedure can be additionally carried out.

After performing the above-mentioned steps, as a general uplink/downlink (UL/DL) signal transmission procedure, the UE may receive the PDCCH and the PDSCH at step S107 and transmit a Physical Uplink Shared Channel (PUSCH)/a Physical Uplink Control Channel (PUCCH) at step S108. Control information transmitted from the UE to the BS via uplink or control information transmitted from the BS to the UE may include DL/UL ACK/NACK signals, a Channel Quality Indicator (CQI), a Scheduling Request (SR), a Precoding Matrix Index (PMI), a Rank Indicator (RI), etc. In case of the 3GPP LTE system, the UE may transmit the above-mentioned CQI/PMI/RI control information through a PUSCH and/or a PUCCH.

Figure 2:
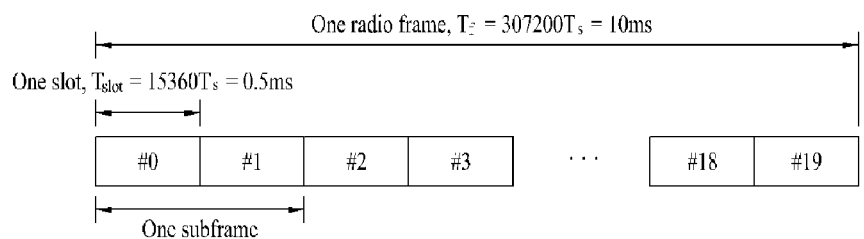
FIG. 2 is a radio frame structure of a 3GPP system.

FIG. 2 is a diagram illustrating a structure of a radio frame used in 3GPP LTE.

Referring to FIG. 2, the radio frame has a length of 10 ms (327200*$T_s$) and includes 10 subframes of equal size. Each subframe has a length of 1 ms and includes two slots. Each slot has a length of 0.5 ms (15360*$T_s$). In this case, $T_s$ represents a sampling time, and is expressed by $T_s=1/(15 \text{ kHz}*2048)=3.2552*10^{-8}$ (about 33 ns). The slot includes a plurality of OFDM symbols in a time domain, and includes a plurality of resource blocks (RBs) in a frequency domain. In the LTE system, one resource block includes twelve (12) subcarriers*seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes or the number of sub-slots, or the number of OFDM symbols in the radio frame.

Figure 3:
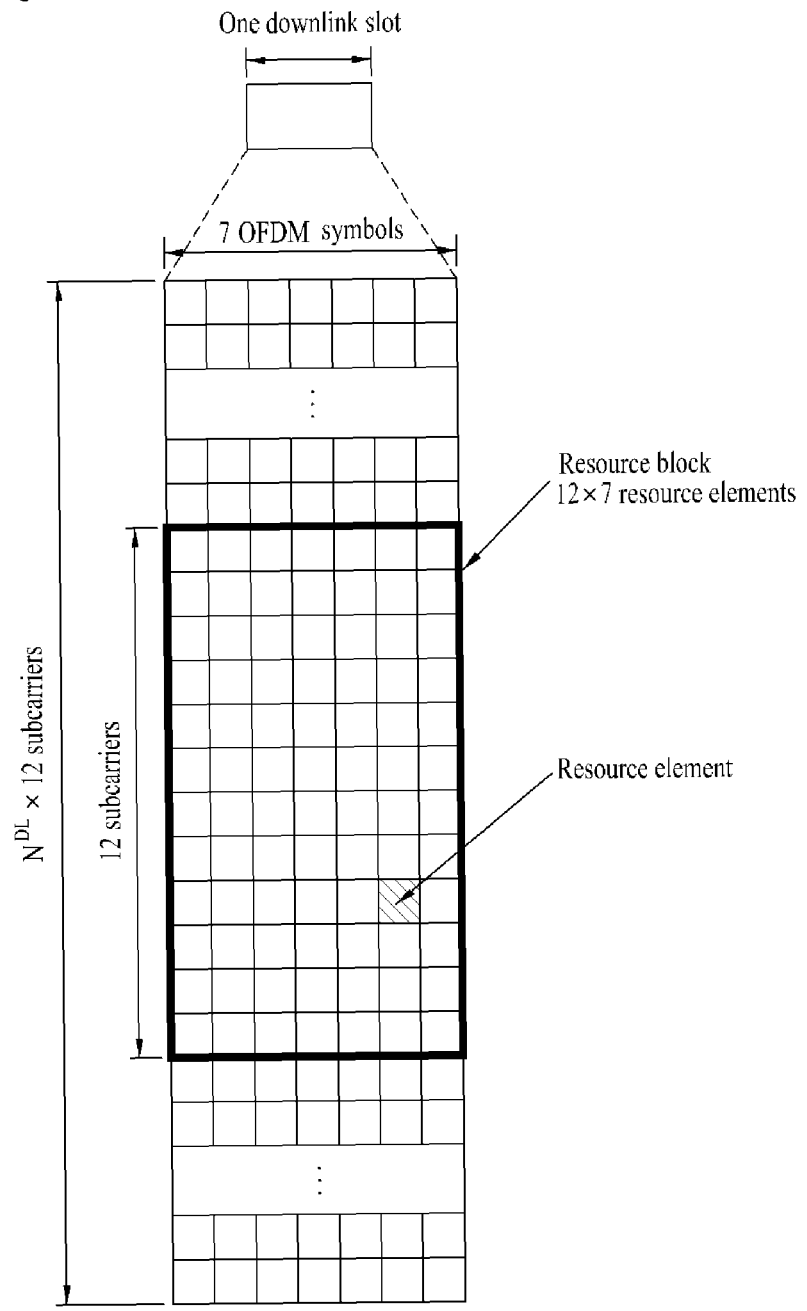
FIG. 3 is a resource frame of a 3GPP system.

FIG. 3 illustrates a resource grid for a downlink slot.

Referring to FIG. 3, a downlink slot includes $N^{DL}_{symb}$ OFDM symbols in a time domain, and includes $N^{DL}_{RB}$ resource blocks in a frequency domain. Each resource block (RB) includes $N^{RB}_{sc}$ subcarriers, such that a downlink slot includes ($N^{DL}_{RB} \times N^{RB}_{sc}$) subcarriers. Although FIG. 3 illustrates that a downlink slot includes 7 OFDM symbols and a resource block (RB) includes 12 subcarriers, the scope or spirit of the present invention is not limited thereto and other examples can also be applied to the present invention. For example, the number of OFDM symbols contained in a downlink slot may be changed according to a Cyclic Prefix (CP)

length. Each element on a resource grid may be defined as a resource element (RE). The RE represents minimum time/frequency resources defined in a physical channel, and is indicated by a single OFDM symbol index or a single sub-carrier index. One RB may include ($N^{DL}_{symb} \times N^{RB}_{sc}$) resource elements (REs). The number ($N^{DL}_{RB}$) of RBs contained in a downlink slot is dependent upon a downlink transmission bandwidth established in a cell.

Figure 4:
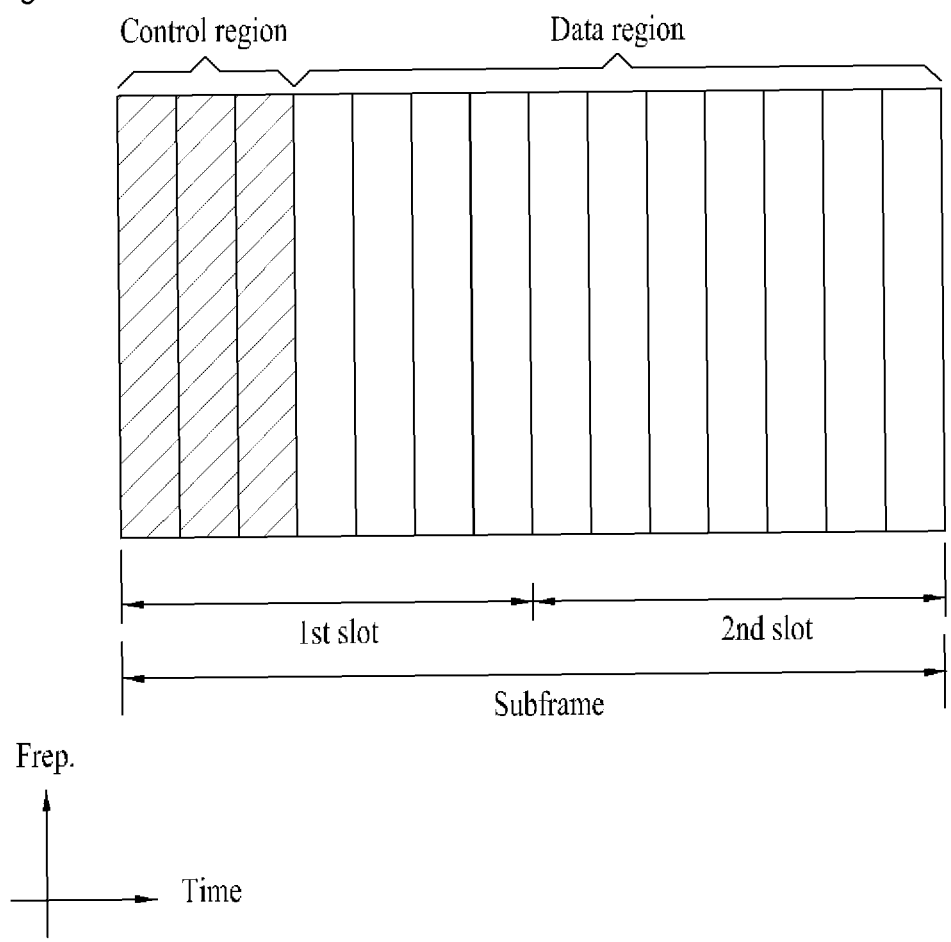
FIG. 4 is a downlink subframe structure.

FIG. 4 exemplarily illustrates a downlink subframe structure for use in a 3GPP system.

Referring to FIG. 4, a downlink subframe includes a plurality of OFDM symbols (e.g., 12 or 14 OFDM symbols). Several OFDM symbols located in the front of the subframe are used as a control region, and the remaining OFDM symbols are used as a data region. The size of the control region may be independently established for each subframe. The control region may be adapted to transmit scheduling information and other control information. The control channel includes a Physical Control Format Indicator CHannel (PCFICH), a Physical Hybrid-automatic repeat request (ARQ) Indicator CHannel (PHICH), a Physical Downlink Control CHannel (PDCCH), and the like. The traffic channel includes a Physical Downlink Shared CHannel (PDSCH).

PCFICH is used as a physical control format indicator channel, and informs the UE of the number of OFDM symbols used for PFCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The PCFICH value indicates values of 1 to 3 or values of 2 to 4 according to the bandwidth. The PHICH is used as a physical HARQ indicator channel, and carries HARQ ACk/NACK signals for uplink transmission. The PHICH includes three REGs, and is cell-specifically scrambled. An ACK/NACK signal is indicated by one bit, is spread out with a spreading factor (SF) of 2 or 4, and is repeated three times. Several PHICHs may be mapped to the same resources.

PDCCH acting as a physical downlink control channel is allocated to N first OFDM symbols of a subframe. In this case, N is an integer of 1 or higher and is indicated by a PCFICH. Control information transmitted through the PDCCH is referred to as downlink control information (DCI). DCI includes uplink scheduling information, downlink scheduling information, and the like. In more detail, PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH, and one CCE includes 9 REGs. The BS determines a PDCCH format according to a DCI to be sent to the UE, and attaches a Cyclic Redundancy Check (CRC) to control information. A unique identifier (e.g., Radio Network Temporary Identifier (RNTI)) is masked on the CRC according to PDCCH owners or utilities.

Figure 5:
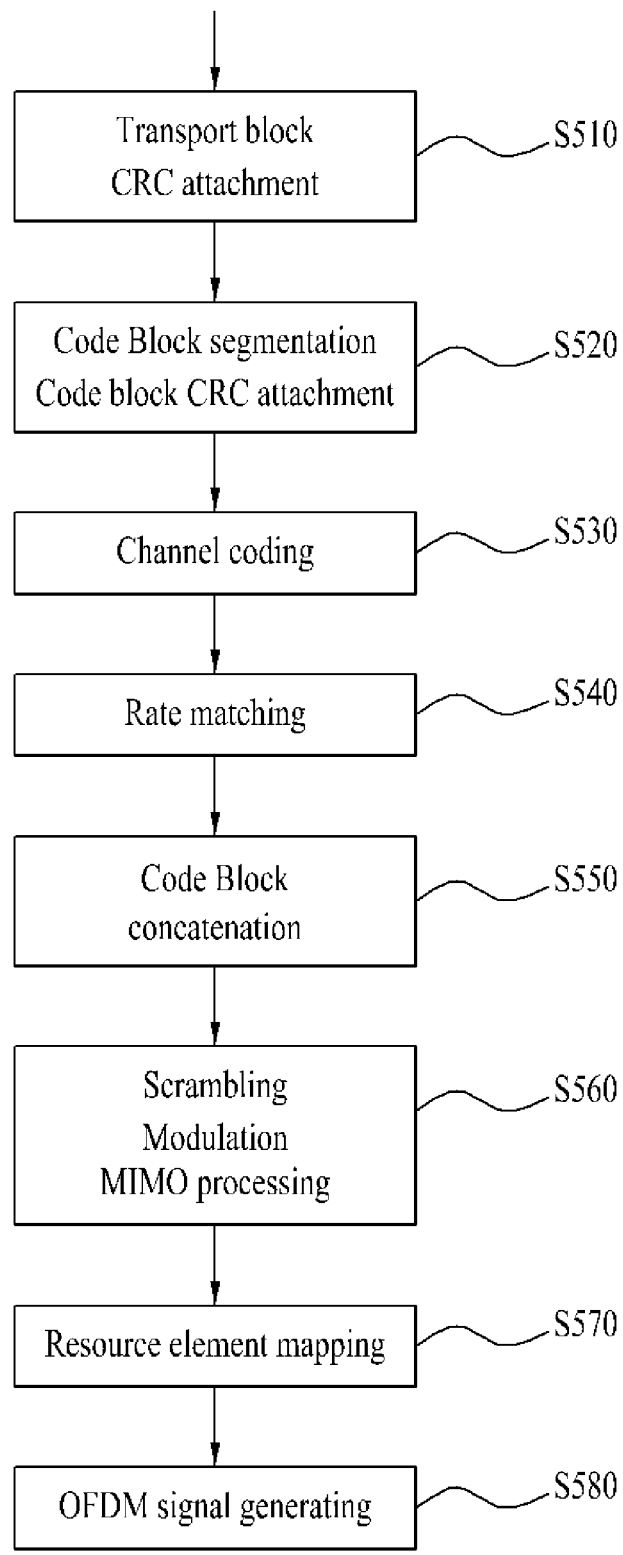
FIG. 5 is a signal processing procedure for generating a physical signal.

FIG. 5 is a flowchart illustrating a DL-SCH process in a physical layer. Referring to FIG. 5, a physical layer attaches a CRC for a transport block (TB) to the transport block (TB) received from a Medium Access Control (MAC) layer at step S510. The TB is divided into a plurality of code blocks (CBs) according to size information, and a CRC for the CB is attached to each CB at step S520. The channel coding is performed on the CRC-attached CB at step 530, rate matching is performed on channel-coded CBs at step S540, and concatenation of the resultant CBs is performed at step 550. The concatenated CBs are scrambled, modulated, and MIMO (Multiple Input Multiple Output)-processed at step S560, and are then mapped to a resource element (RE) at step S570. Thereafter, OFDM signal processing is performed on the RE-mapped information, and the resultant information is transmitted to the UE at step S580.

Figure 6:
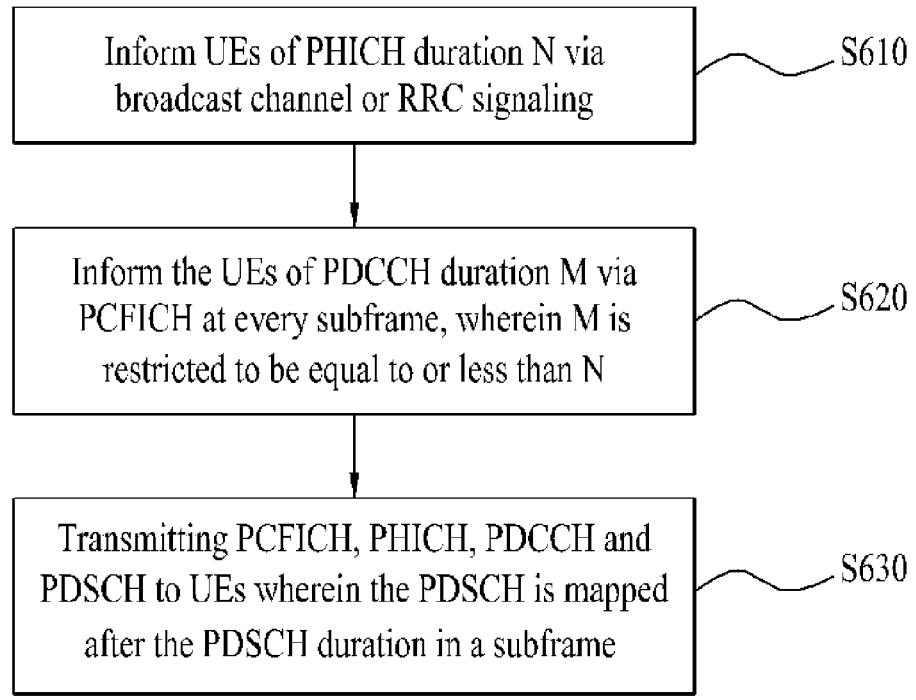
FIG. 6 is a flowchart illustrating a procedure for transmitting a physical channel through a subframe.
Figure 7:
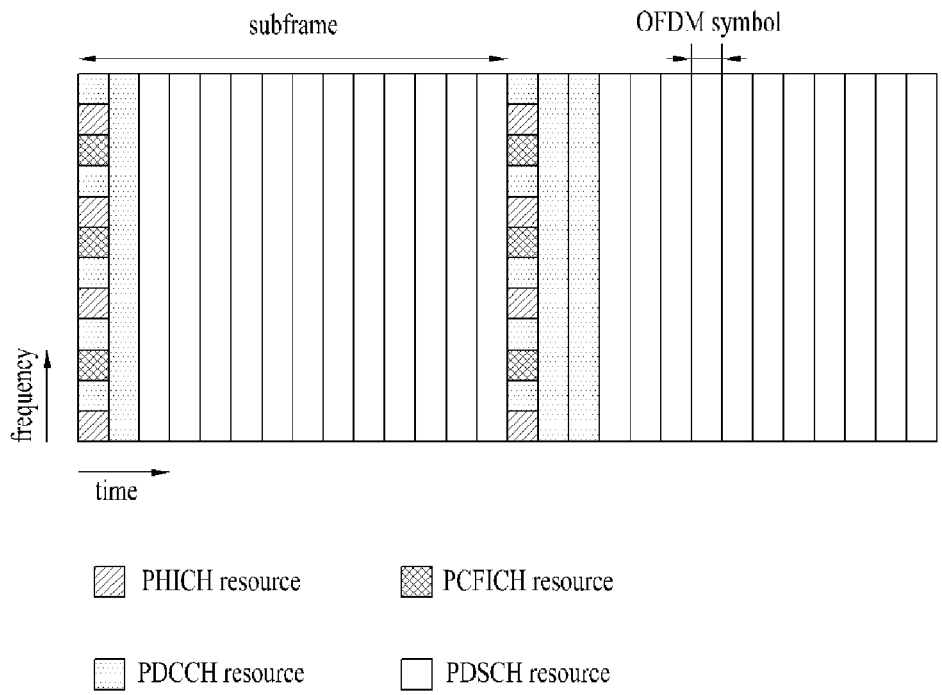
FIGS. 7 and 8 illustrate a physical channel structure on a subframe.
Figure 8:
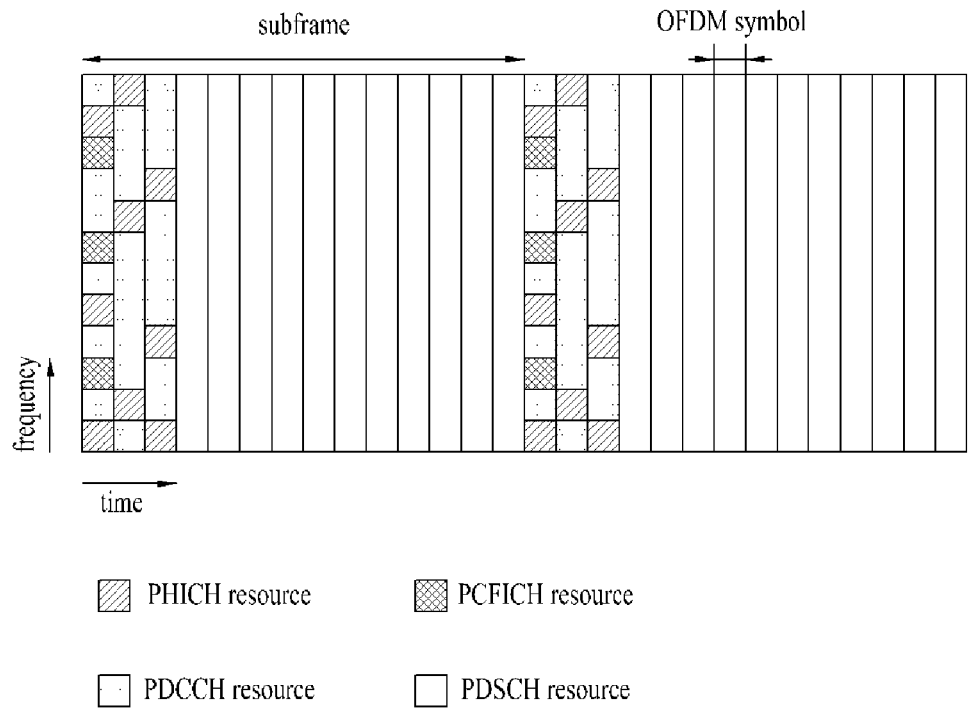

FIG. 6 is a flowchart illustrating a method for transmitting a physical channel through a subframe in an LTE system. FIGS. 7 and 8 illustrate a physical channel structure on a subframe.

Referring to FIG. 6, a BS informs a UE of PHICH duration (N) via a broadcast channel or RRC (Radio Resource Control) signaling at step S610. PHICH duration represents the number of OFDM symbols used for PHICH transmission in a subframe. The PHICH duration starts from a first OFDM symbol of a subframe. In addition, the BS informs the UE of a PDCCH duration (M) through a PCFICH at every subframe at step S620. The PDCCH duration represents the number of OFDM symbols used for PDCCH transmission in a subframe. The PDCCH duration starts from the first OFDM symbol of the subframe. The number of PDCCH durations may be set to 1~3 or 2~4 according to system bandwidth. However, it should be noted that the PDCCH duration (M) is set to be equal to or less than the PHICH duration (N). Thereafter, the BS transmits PCFICH, PHICH and PDCCH through a control region of a subframe, and transmits a PDSCH to the UE through a data region of the subframe at step S630. The data region (i.e., PDSCH) starts after the PDCCH duration of the subframe.

As shown in FIG. 6, in a conventional LTE system, the BS informs (or signals) the UE of the size of PDCCH duration through a PCFICH at every subframe, and the UE decodes a PDCCH of a corresponding subframe on the basis of the PDCCH duration obtained from the PCFICH. On the other hand, the PHICH duration may be semi-statically changed according to cell coverage adjustment, and is signaled through RRC signaling (e.g., PBCH). As a result, since signaling overhead related to PHICH duration is reduced, the UE quickly recognizes the PHICH duration (or other PHICH-associated information) in case of initial access, such that the PHICH region may be excluded from an available PDCCH region. Referring to FIGS. 7 and 8, the PDCCH duration contained in a subframe is always set to be equal to or lager than the PHICH duration in such a manner that the PDCCH duration can include all of PCFICH, PHICH and PDCCH. The above-mentioned structure separates the control region and the data region (i.e., PDSCH region) of the subframe from the time domain as shown in FIG. 4, such that PDSCH decoding can be simplified. However, even when there are not many PDCCHs to be transmitted in a corresponding subframe, it is necessary for the PDCCH duration to be equal to or larger than the PHICH duration, such that the above-mentioned subframe structure may result in inefficient usage of OFDM symbol resources. In the meantime, FIGS. 7 and 8 have been disclosed only for illustrative purposes and better understanding of the present invention, and positions, sizes, etc. of individual physical channels may be different from those of FIGS. 7 and 8 as necessary.

Therefore, in order to effectively use OFDM resources, the present invention provides a method for allowing the PDCCH duration to be smaller than the PHICH duration in the subframe. In this case, in OFDM symbol(s) (hereinafter referred to as a special PHICH duration) that may belong to the PHICH duration but not to the PDCCH duration, frequency-time resources not used for PHICH transmission may be adapted to transmit necessary physical channel/signal (e.g., PDSCH, reference signal, etc.). A reference signal capable of being transmitted through a special PHICH duration may include a positioning reference signal (PRS).

Operations of a base station (BS) (or a repeater) and a UE on the condition that the PDCCH duration is set to be smaller than the PHICH duration will hereinafter be described with reference to the annexed drawings.

First Embodiment

In accordance with the first embodiment of the present invention, in the case where the PDCCH duration is smaller than the PHICH duration in a subframe, a frequency-time region not used for PHICH transmission in OFDM symbol(s), that is/are reserved for PHICH transmission but is not reserved for PDCCH transmission, may be used for PDSCH transmission.

Figure 9:
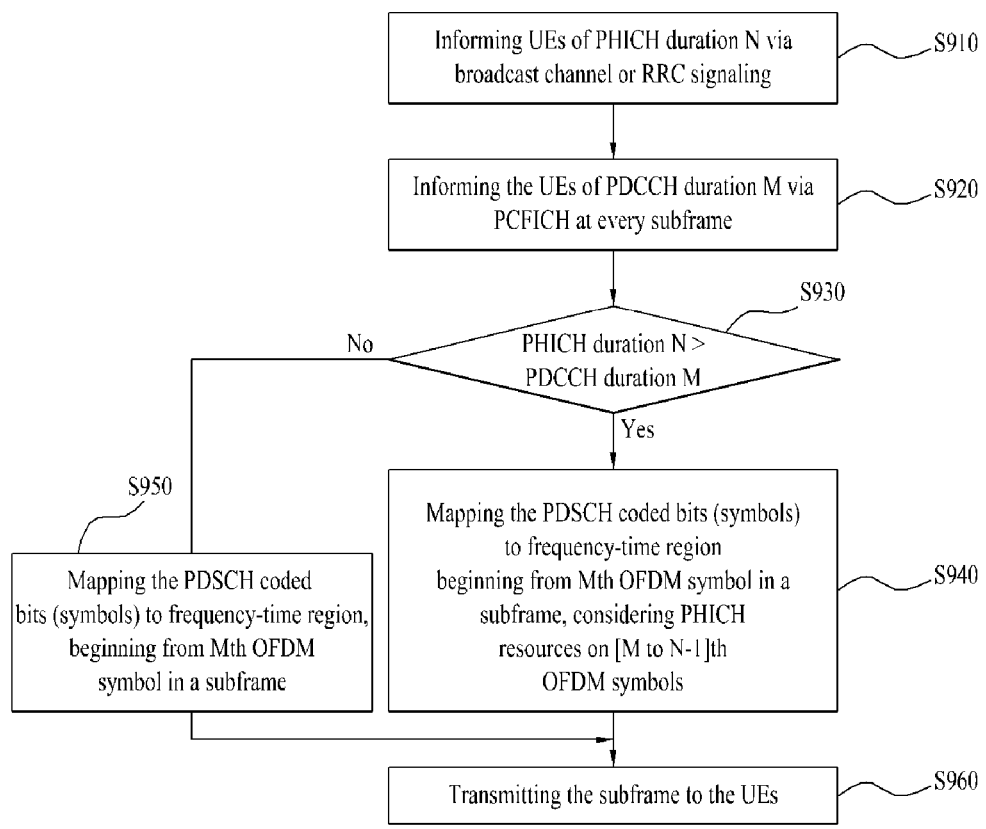
FIG. 9 is a flowchart illustrating a method for transmitting a physical channel according to a first embodiment of the present invention.
Figure 10:
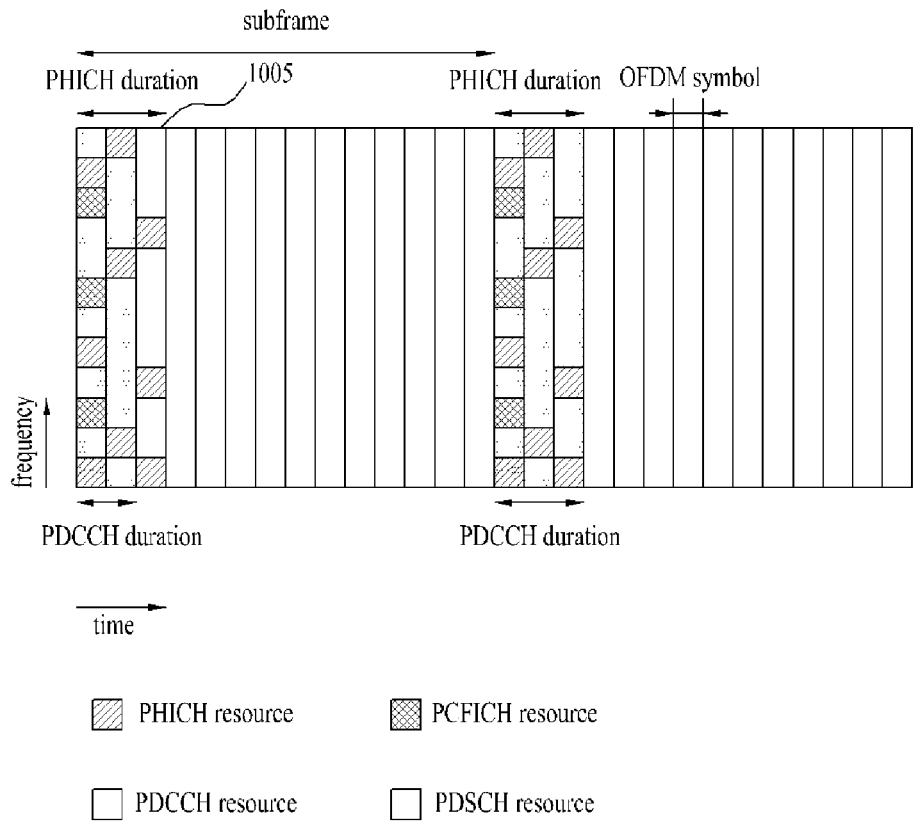
FIG. 10 illustrates a transmission example of a physical channel according to an embodiment of the present invention.

FIG. 9 is a flowchart illustrating a method for transmitting a physical channel according to a first embodiment of the present invention. FIG. 10 illustrates a structure of a physical channel according to the first embodiment of the present invention.

Referring to FIGS. 9 and 10, the BS informs the UE of the PHICH duration (N) through either a broadcast channel or RRC signaling at step S910. In addition, the BS informs the UE of the PDCCH duration (M) through a PCFICH at every subframe at step S920. N or M is an independently-decided integer, for example, an integer of 0 or higher. The number of PDCCH durations may be set to 1~3 or 2~4 according to system bandwidth. The BS determines whether the PHICH duration (N) is larger than the PDCCH duration (M) at step S930. In the case where the PHICH duration (N) is equal to or smaller than the PDCCH duration (M), the BS maps the PDSCH coded bits to a frequency-time region starting from an M-th OFDM symbol of the subframe at step S950 (See the right subframe of FIG. 10). On the other hand, in the case where the PHICH duration (N) is larger than the PDCCH duration (M), the BS can map the PDSCH coded bit (symbol) to the frequency-time region starting from the M-th OFDM symbol of the subframe in consideration of PHICH resources of the special PHICH duration (i.e., [M to N−1]-th OFDM symbols) (See the left subframe of FIG. 10).

Two exemplary methods can be used at step S940, but it should be noted that the scope or spirit of the present invention is not limited only thereto and other exemplary methods can also be applied to the present invention as necessary. In the first exemplary method, the PDSCH coded bits or modulated symbols are not mapped to REs reserved for PHICH in the special PHICH duration 1005. That is, the PDSCH coded bits or modulated symbols are rate-matched prior to the mapping in consideration of the PHICH resources of the special PHICH duration 1005. The rate matching may be performed at step S540 of FIG. 5 or may be additionally performed at any separately-defined step. In the second exemplary method, the PDSCH modulated symbols or coded bits are (virtually) mapped to REs reserved for PHICH in the PHICH duration 1005. However, when actually transmitting the corresponding REs, the PDSCH coded bits or modulated symbols are replaced with by the PHICH. That is, while the PDSCH coded bits or modulated symbols are (virtually) mapped to the special PHICH duration 1005, the PDSCH coded bits or modulated symbols mapped to PHICH resources are thereafter punctured. This puncturing process may be carried out at step S670 (RE mapping step) of FIG. 5. After that, the BS transmits a subframe to the UE at step S960.

Figure 11:
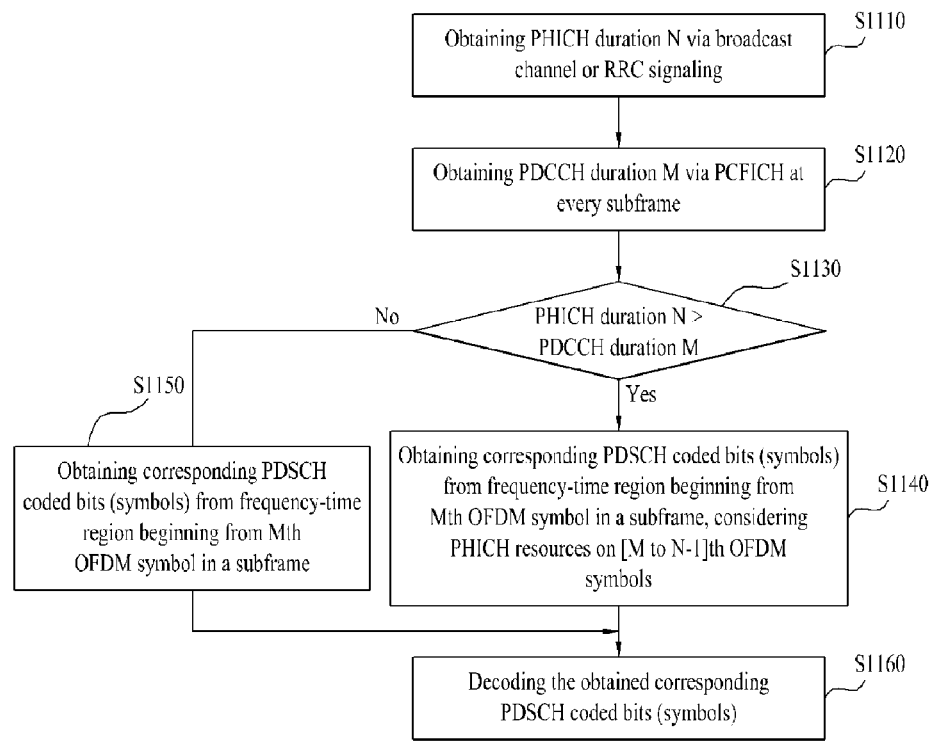
FIGS. 11 and 12 illustrate examples for allowing a user equipment (UE) to process a physical signal according to a first embodiment of the present invention.
Figure 12:
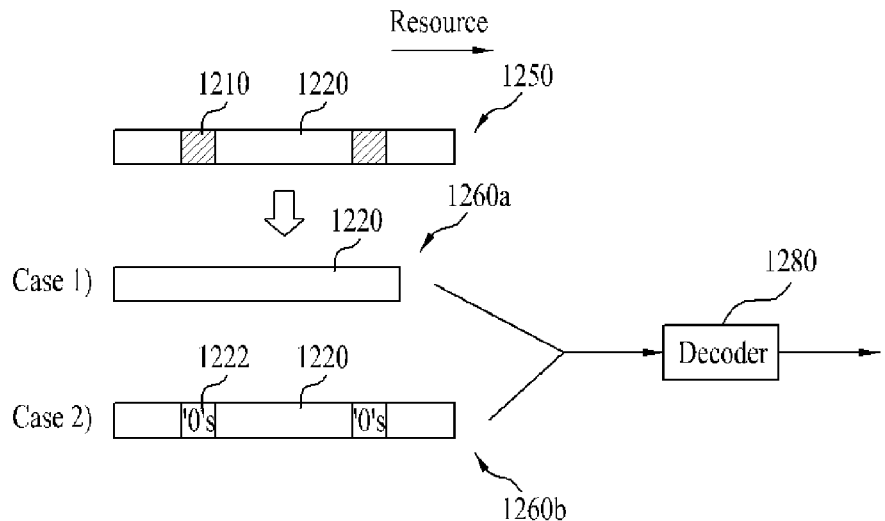

FIGS. 11 and 12 illustrate an example for allowing a UE to process a physical channel according to a first embodiment of the present invention.

Referring to FIGS. 11 and 12, the UE obtains the PHICH duration (N) via a broadband channel or RRC signaling at step S1110. For example, the UE decodes contents of PBCH (or RRC signaling for carrying PHICH duration information), such that it can obtain PHICH duration and other PHICH-associated information. In addition, the UE decodes PCFICH signaled through a subframe, such that it obtains the PDCCH duration (M) of a corresponding subframe at step S1120. Thereafter, in the case where the PDCCH duration (M) is equal to or larger than the PHICH duration (N) at step S1130 (See the right subframe of FIG. 10), the PDSCH coded bits or modulated symbols are obtained from the frequency-time resources starting from the M-th OFDM symbol of the subframe at step S1150.

On the other hand, in the case where the PDCCH duration (M) is smaller than the PHICH duration (N) (See the left subframe of FIG. 10) at step S1130, the UE can obtain the PDSCH coded bits (symbols) from the frequency-time resources starting from the M-th OFDM symbol of the subframe in consideration of PHICH resources on the special PHICH duration (i.e., [M to N−1]-th OFDM symbols) at step S1140. That is, in the case where the scheduling is performed in a manner that the UE can decode the PDSCH in a subframe wherein the PDCCH duration is smaller than the PHICH duration (i.e., in the case where the scheduling is performed in a manner that the UE can decode the PDSCH on a Resource Block (RB) including OFDM symbol(s) of the special PHICH duration as shown in the left subframe of FIG. 10), the UE obtains the PDSCH coded bits or modulated symbols in consideration of PHICH resources on the special PHICH duration (i.e., [M to N−1]-th OFDM symbols).

In more detail, in the case where the frequency-time resources 1250 located behind the PDCCH duration include the PHICH resource 1210 and the rate-matched PDSCH bits (or symbols) 1220, the UE collects only the PDSCH coded bits (symbols) 1220 contained in the frequency-time resources 1250 located behind the PDCCH duration, such that it generates newly PDSCH coded bits (symbols) 1260a having no PHICH 1210. In addition, in the case where the frequency-time resources 1250 located behind the PDCCH duration include the PHICH resource 1210 and the punctured PDCCH bit (symbol) 1220, the UE fills coded bits corresponding to the punctured part 1222 with specific values (e.g., a plurality of '0' values), instead of using only the remaining PDCCH bits (symbols) 1220 obtained after the puncturing, such that it can obtain the newly PDSCH coded bits (symbols) 1260b. Thereafter, the UE inputs the generated PDSCH coded bits to the PDSCH decoder 1280 at step S1160.

Second Embodiment

In accordance with the second embodiment of the present invention, in the case where the PDCCH duration is smaller than the PHICH duration in a subframe, a frequency-time region not used for PHICH transmission in OFDM symbol(s), that is/are reserved for the PHICH transmission but is not reserved for PDCCH transmission, may not be used for PDSCH transmission.

Figure 13:
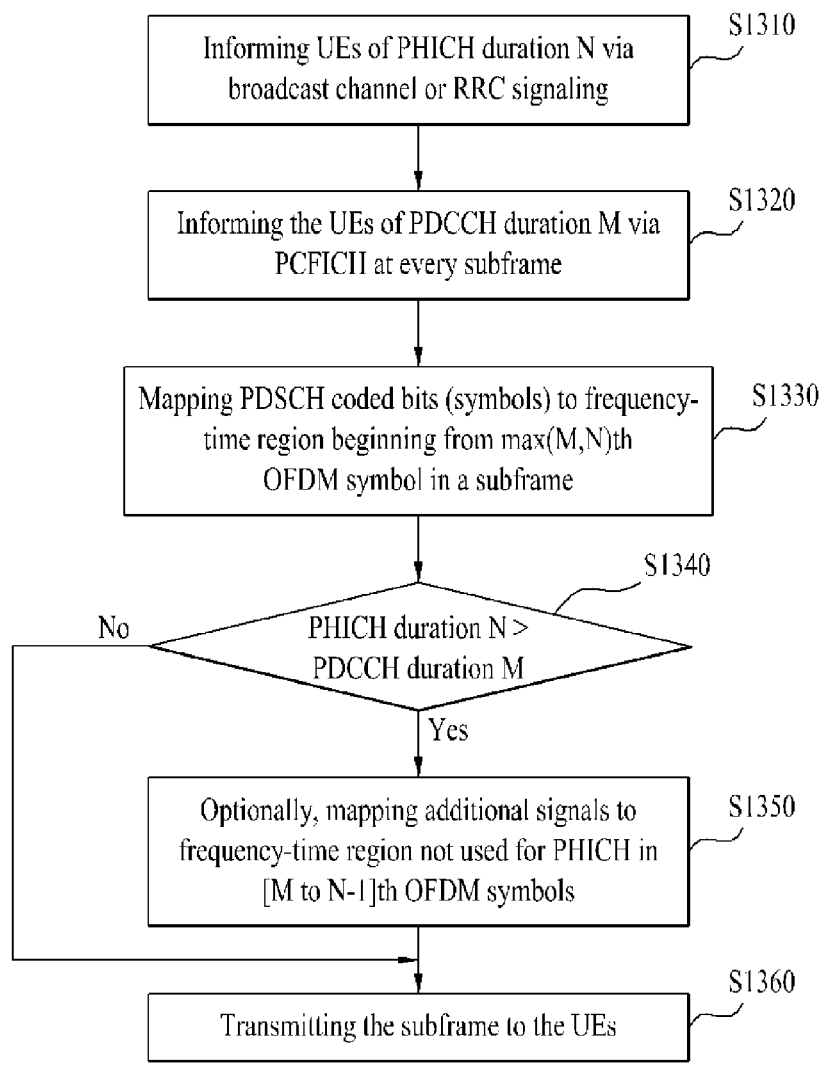
FIG. 13 is a flowchart illustrating a method for transmitting a physical channel according to a second embodiment of the present invention.
Figure 14:
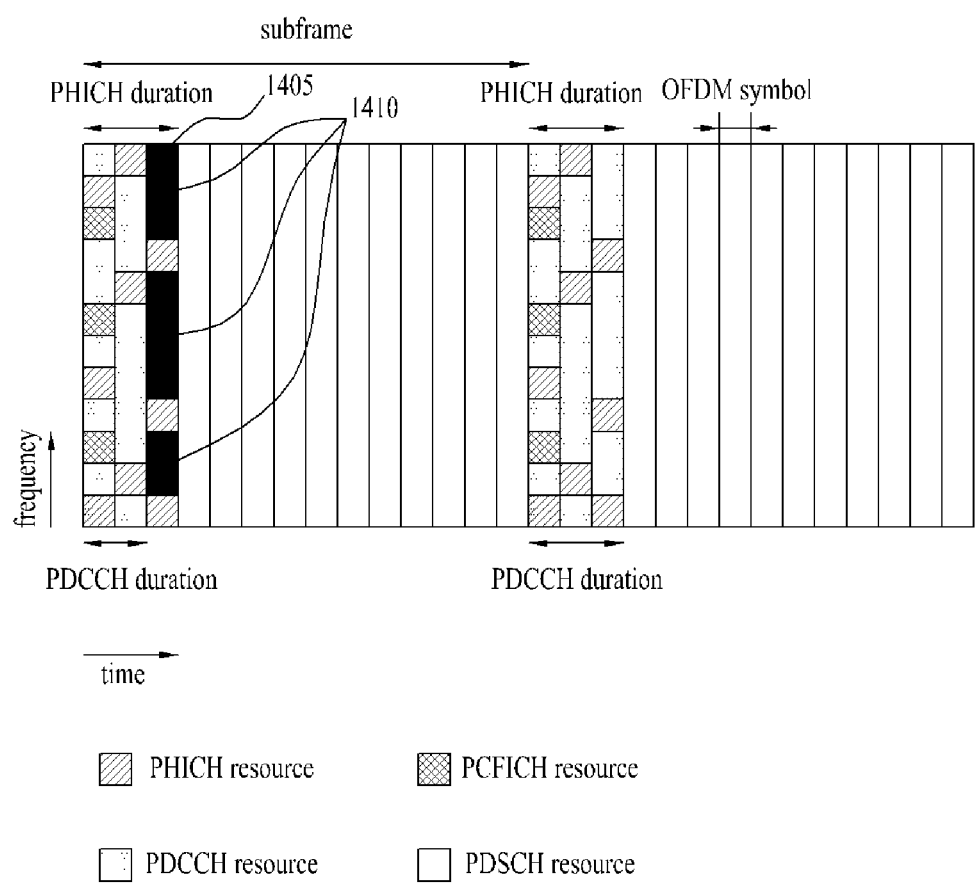
FIG. 14 illustrates a transmission example of a physical channel according to a second embodiment of the present invention.

FIG. 13 is a flowchart illustrating a transmission example of a physical channel according to the second embodiment of the present invention. FIG. 14 is a flowchart illustrating a method for transmitting a physical channel according to the second embodiment of the present invention.

Referring to FIGS. 13 and 14, a base station (BS) informs the UE of the PHICH duration (N) through a broadband channel or RRC signaling at step S1310. In addition, the BS informs the UE of the PDCCH duration (M) through the PCFICH at every subframe at step S1320. N or M is an independently-decided integer, for example, an integer of 0 or higher. The BS decides a PDSCH boundary using a larger one of the PHICH duration (N) and the PDCCH duration (M) as a reference. That is, the BS maps the PDSCH coded bits or symbols to the frequency-time resources starting from the max(M,N)-th OFDM symbol at step S1330. 'max(a,b)' represents a higher one of 'a' and 'b'.

In the case where the PHICH duration (N) is equal to or smaller than the PDCCH duration (M) at step S1340, the BS transmits the subframe on which the physical channel is mapped to the UE at step S1360 (See the right subframe of FIG. 14). On the other hand, in the case where the PHICH duration (N) is larger than the PDCCH duration (M) at step S1340, the BS may map additional signals to frequency-time resources 1410 not used for PHICH transmission in a special PHICH duration (i.e., [M to N−1]-th OFDM symbols) 1405 as necessary at step S1350 (See the left subframe of FIG. 14). For example, an arbitrary control channel, a data channel other than the PDSCH, and a reference signal (e.g., positioning reference signal (PRS)) may be additionally transmitted through the frequency-time resources 1410 not used for PHICH transmission in the special PHICH duration 1405. Thereafter, the BS transmits the subframe mapped to the physical channel to the UE at step S1360.

Figure 15:
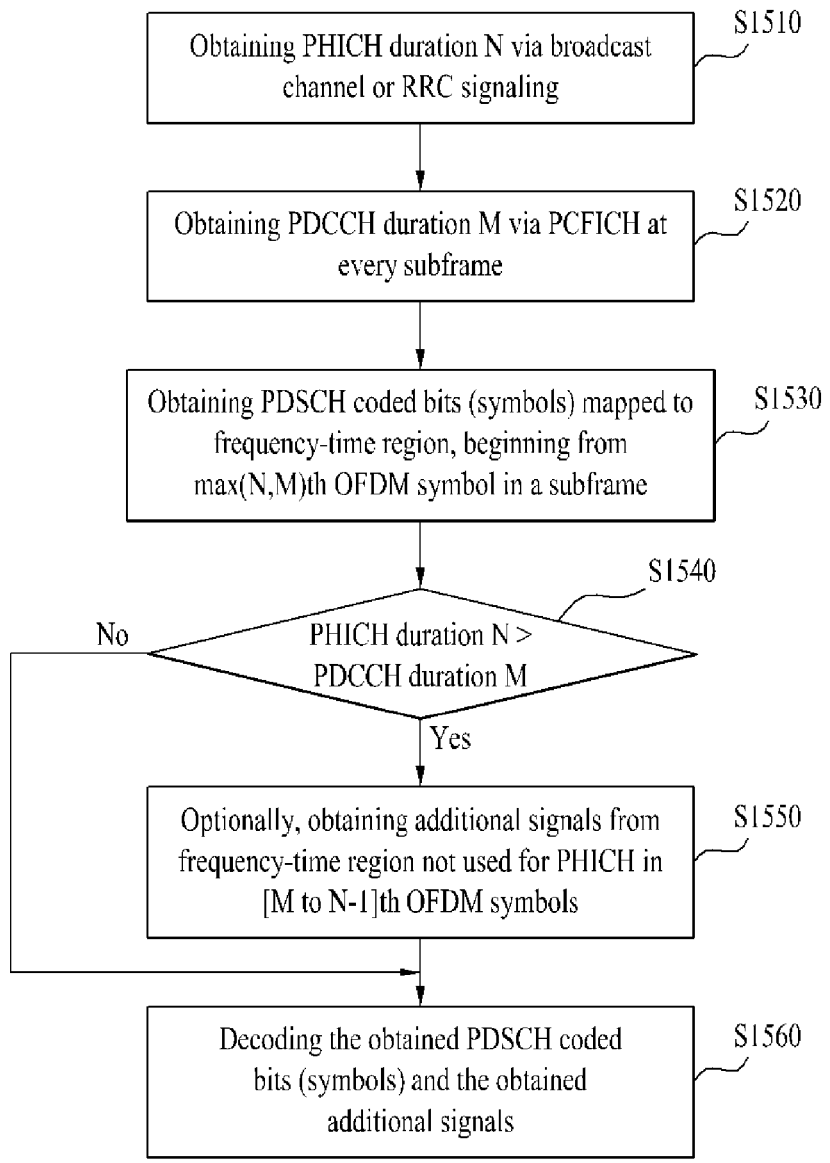
FIG. 15 is a flowchart illustrating a method for processing a physical signal according to a second embodiment of the present invention.

FIG. 15 is a flowchart illustrating a method for processing a physical signal according to a second embodiment of the present invention.

Referring to FIG. 15, the UE obtains the PHICH duration (N) through a broadband channel or RRC signaling at step S1510. For example, the UE decodes contents of PBCH (or RRC signaling carrying PHICH duration information), such that it obtains the PHICH duration and other PHICH-associated information. In addition, the UE can obtain the PDCCH duration (M) of the corresponding subframe by decoding the PCFICH signaled through the subframe at step S1520. Thereafter, the UE obtains the PDSCH coded bits or symbols from the frequency-time resources starting from the max(M,N)-th OFDM symbol at step S1530. That is, in the case where the PDCCH duration (M) is equal to or larger than the PHICH duration (N) at step S1540, the UE obtains the PDSCH coded bits (symbols) from the M-th OFDM symbol of the subframe, and decodes them at step S1560.

On the other hand, in the case where the PDCCH duration (M) is smaller than the PHICH duration (N) at step S1540, the UE may obtain additional signals from the frequency-time resources 1410 not used for PHICH transmission from the special PHICH duration (i.e., [M to N−1]-th OFDM symbols) 1405 as necessary at step S1540. For example, the UE may obtain an arbitrary control channel, a data channel other than a PDSCH, and a reference signal (e.g., a positioning reference signal (PRS)) from the frequency-time resources 1410. Thereafter, the UE decodes not only the PDSCH bits (symbols) obtained from the N-th OFDM symbol of the subframe but also the additional signals obtained from the special PHICH duration 1405 at step S1560.

Figure 16:
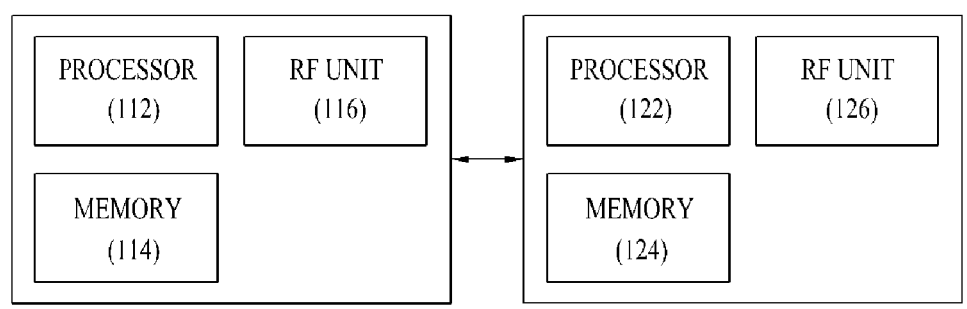
FIG. 16 illustrates examples of a base station and a user equipment (UE) that can be applied to an embodiment of the present invention.

FIG. 16 is a diagram illustrating a base station and a user equipment that can be applied to one embodiment of the present invention.

Referring to FIG. 16, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. For example, the processor 112 can perform various operations for channel coding, channel generation/mapping, OFDM signal generation. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. For example, the processor 122 can perform various operations for digital signal processing, channel de-mapping, channel decoding. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system, and more particularly, to a method for flexible allocation of control signal resources of a wireless communication system and an apparatus thereof.

The invention claimed is:

1. A method for processing a downlink subframe at a user equipment in a wireless communication system, the method comprising:

receiving information associated with a Physical Hybrid-automatic repeat request (ARQ) Indicator Channel (PHICH) duration;

receiving a subframe that includes a Physical Hybrid-automatic repeat request (ARQ) Indicator Channel (PHICH), a Physical Downlink Control Channel (PDCCH), and a Physical Downlink Shared Channel (PDSCH); and obtaining the PDSCH from next of a PDCCH duration in the received subframe, wherein, if the PHICH duration is larger than the PDCCH duration, the obtaining of the PDSCH includes replacing content of PHICH resources with a specific value in a duration that corresponds to the PHICH duration but not to the PDCCH duration.

2. The method of claim 1, wherein the specific value includes zero '0'.

3. A user equipment comprising:

a radio frequency (RF) unit configured to transmit and receive RF signals; and a processor connected to the RF unit, wherein the RF unit receives information associated with a Physical Hybrid-automatic repeat request (ARQ) Indicator Channel (PHICH) duration, the RF unit receives a subframe that includes a Physical Hybrid-automatic repeat request (ARQ) Indicator Channel (PHICH), a Physical Downlink Control Channel (PDCCH), and a Physical Downlink Shared Channel (PDSCH), and the processor obtains the PDSCH from next of a PDCCH duration in the received subframe, and wherein if the PHICH duration is larger than the PDCCH duration, the obtaining of the PDSCH includes replacing content of the PHICH resources with a specific value in a duration that corresponds to the PHICH duration but not to the PDCCH duration.

4. The user equipment of claim 3, wherein the specific value includes zero '0'.

* * * * *

UNITED STATES PATENT AND TRADEMARK OFFICE
CERTIFICATE OF CORRECTION

PATENT NO. : 9,100,156 B2  Page 1 of 1
APPLICATION NO. : 13/264148
DATED : August 4, 2015
INVENTOR(S) : Joon Kui Ahn et al.

It is certified that error appears in the above-identified patent and that said Letters Patent is hereby corrected as shown below:

ON THE TITLE PAGE:

Please insert the following:

-- Related U.S. Application Data

(60)  Provisional application No. 61/221,572, filed on Jun. 30, 2009. --

Signed and Sealed this
Fifth Day of January, 2016

Michelle K. Lee
*Director of the United States Patent and Trademark Office*